United States Patent

Sedarat

(10) Patent No.: US 9,942,125 B1
(45) Date of Patent: Apr. 10, 2018

(54) HIGH-SPEED ETHERNET DIAGNOSTIC APPARATUS AND METHOD FOR CROSS-PAIR FAULTS

(71) Applicant: Aquantia Corporation, Milpitas, CA (US)

(72) Inventor: Hossein Sedarat, San Jose, CA (US)

(73) Assignee: Aquantia Corp., Milpitas, CA (US)

( * ) Notice: Subject to any disclaimer, the term of this patent is extended or adjusted under 35 U.S.C. 154(b) by 701 days.

(21) Appl. No.: 13/625,820

(22) Filed: Sep. 24, 2012

(51) Int. Cl.
*H04W 24/10* (2009.01)
*H04W 28/04* (2009.01)
*H04L 12/26* (2006.01)

(52) U.S. Cl.
CPC ............. *H04L 43/50* (2013.01); *H04W 24/10* (2013.01); *H04W 28/048* (2013.01)

(58) Field of Classification Search
CPC ...... H04L 43/50; H04W 24/10; H04W 28/048
USPC ........................................ 370/201, 252, 286
See application file for complete search history.

(56) References Cited

U.S. PATENT DOCUMENTS

| | | | | |
|---|---|---|---|---|
| 6,160,790 A * | 12/2000 | Bremer | | 370/201 |
| 7,346,012 B2 * | 3/2008 | Stopler | | 370/286 |
| 7,701,867 B2 * | 4/2010 | Bui | | 370/252 |
| 2006/0181283 A1* | 8/2006 | Wajcer | | H04B 3/46 324/539 |
| 2013/0242760 A1* | 9/2013 | Peyton | | H04Q 1/136 370/250 |

* cited by examiner

*Primary Examiner* — Gbemileke J Onamuti
(74) *Attorney, Agent, or Firm* — Lance Kreisman; Peninsula Patent Group (57) ABSTRACT

A method of detecting a fault in an Ethernet system is disclosed. The system includes multiple physical channels, each channel bounded by a pair of link partner transceivers. The method includes selectively coupling at least a first one of the physical channels to a second one of the physical channels. A test pattern is then transmitted along the first and second physical channels. Cross-channel information corresponding to the transmitted test pattern is received. An echo canceller in the second of the multiple channels is trained to generate an impulse response corresponding to the received crosstalk information. For a selected segment of the system, the generated impulse response is compared to an expected impulse response for that selected segment. The determination of whether a fault exists is based on the comparison.

19 Claims, 6 Drawing Sheets

HIGH-SPEED ETHERNET DIAGNOSTIC APPARATUS AND METHOD FOR CROSS-PAIR FAULTS

TECHNICAL FIELD

The disclosure herein relates to electronic communications, and more particularly to detecting and identifying faults in high-speed Ethernet systems.

BACKGROUND

10 Gigabit Ethernet is an increasingly popular communication standard, with a nominal data rate of 10 Gbit/s. One form of 10 Gigabit Ethernet is IEEE 10GBASE-T, used to provide 10 gigabit per second connections over four pairs of unshielded or shielded twisted pair copper wires. It is desirable from a manufacturing, deployment and testability point of view to have a mechanism to automatically identify and categorize channel faults in high-speed Ethernet systems, such as 10GBASE-T rather than manually inspect them. One source of faults often relates to cross-pair coupling between adjacent pairs of wires. Extreme cases involve actual short circuits between the pairs.

What is needed is a high-speed and low-cost manner of carrying out high-speed Ethernet cable diagnostics between respective pairs of wires without the need for manual intervention or inspection.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of a transceiver circuit and associated methods of operation are disclosed. In one embodiment, a method of detecting a fault in an Ethernet system is disclosed. The system includes multiple physical channels, each channel bounded by a pair of link partner transceivers. The method includes selectively coupling at least a first one of the physical channels to a second one of the physical channels. A test pattern is then transmitted along the first and second physical channels. Cross-channel information corresponding to the transmitted test pattern is received. An echo canceller in the second of the multiple channels is trained to generate an impulse response corresponding to the received crosstalk information. For a selected segment of the system, the generated impulse response is compared to an expected impulse response for that selected segment. The determination of whether a fault exists is based on the comparison.

In a further embodiment, an Ethernet transceiver system for coupling to an Ethernet cable is disclosed. The Ethernet transceiver system includes a first physical channel having a first transmit circuit path having an input, a first receive circuit path, and a first echo canceller circuit. The first echo canceller circuit is disposed between the first transmitter circuit path and the first receiver circuit path to, during a first operation mode, characterize echo signals along the first transmit path. The system includes a second physical channel having a second transmit circuit path having an input, a second receive circuit path, and a second echo canceller circuit. The second echo canceller circuit is disposed between the second transmitter circuit and the second receive circuit path to, during the first mode, characterize echo signals along the second transmit path. During a cable diagnostic mode of operation, the second echo canceller is selectively coupled to the first transmit path to characterize a crosstalk path between the first and second physical channels.

Figure 1:
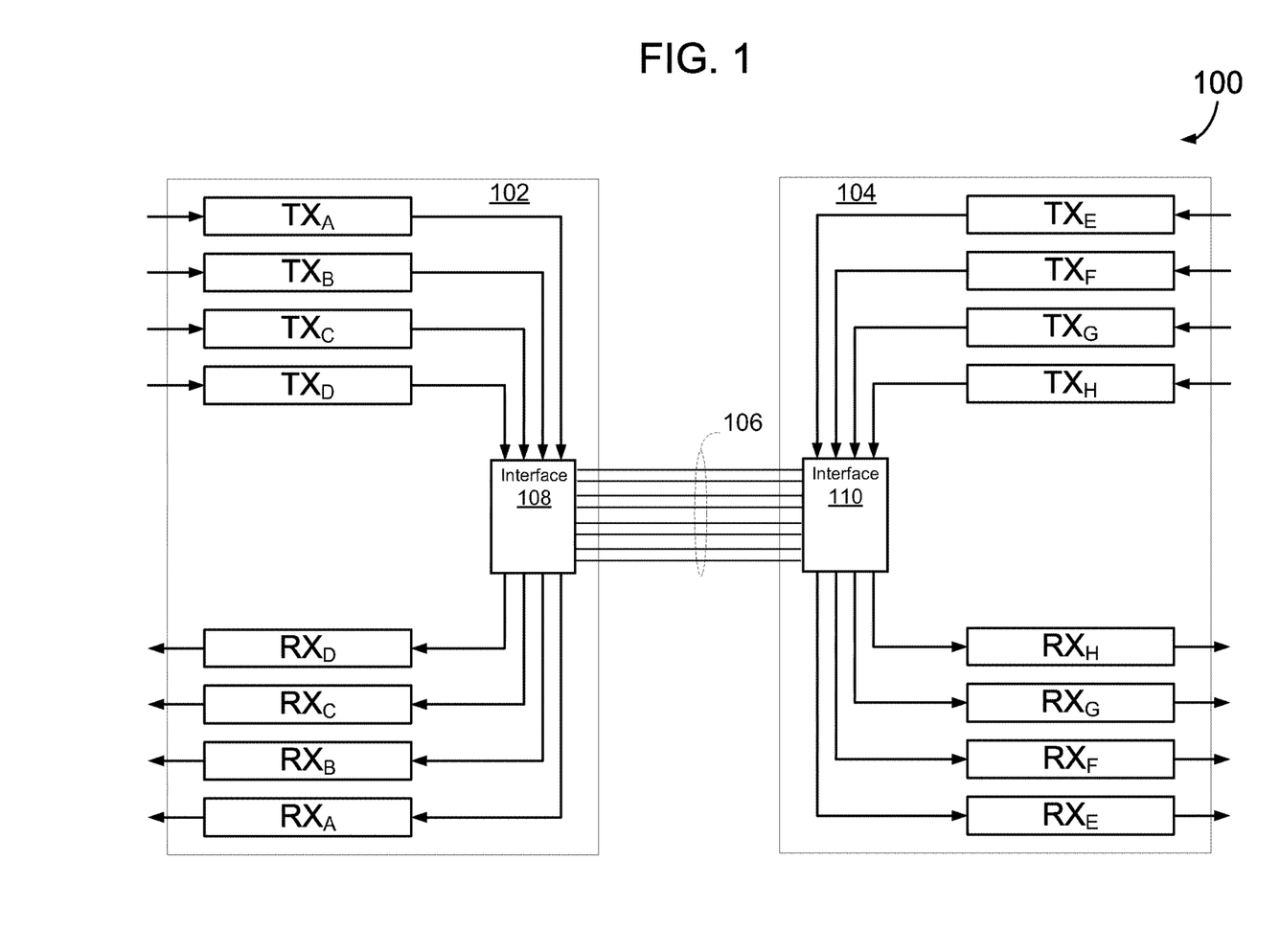
FIG. 1 illustrates a high-level transmitter/receiver (transceiver) channel architecture for the 10GBASE-T communication standard.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters $TX_A$-$TX_A$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as that corresponding to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

In one example, from the point of view of the first transceiver chip 102, data transmissions during a normal or regular operation mode from a local transmitter TX are provided to the interface 108, which outputs the data on a corresponding channel of the communication link 106. The data is received by the link partner, the second transceiver chip 104. The interface 110 of the transceiver 104 provides the received data to its receiver RX connected to that same channel. Furthermore, due to noise effects such as near-end crosstalk and echo, the data transmitted by the transmitters is also received by the near-end receivers in the same transceiver. Filters can be used to filter out this noise so that the receivers receive only data from other transceivers. In virtually all real scenarios, the data transmitted by a local transmitter has no dependence or relation with data being received by the corresponding local receiver.

Figure 2:
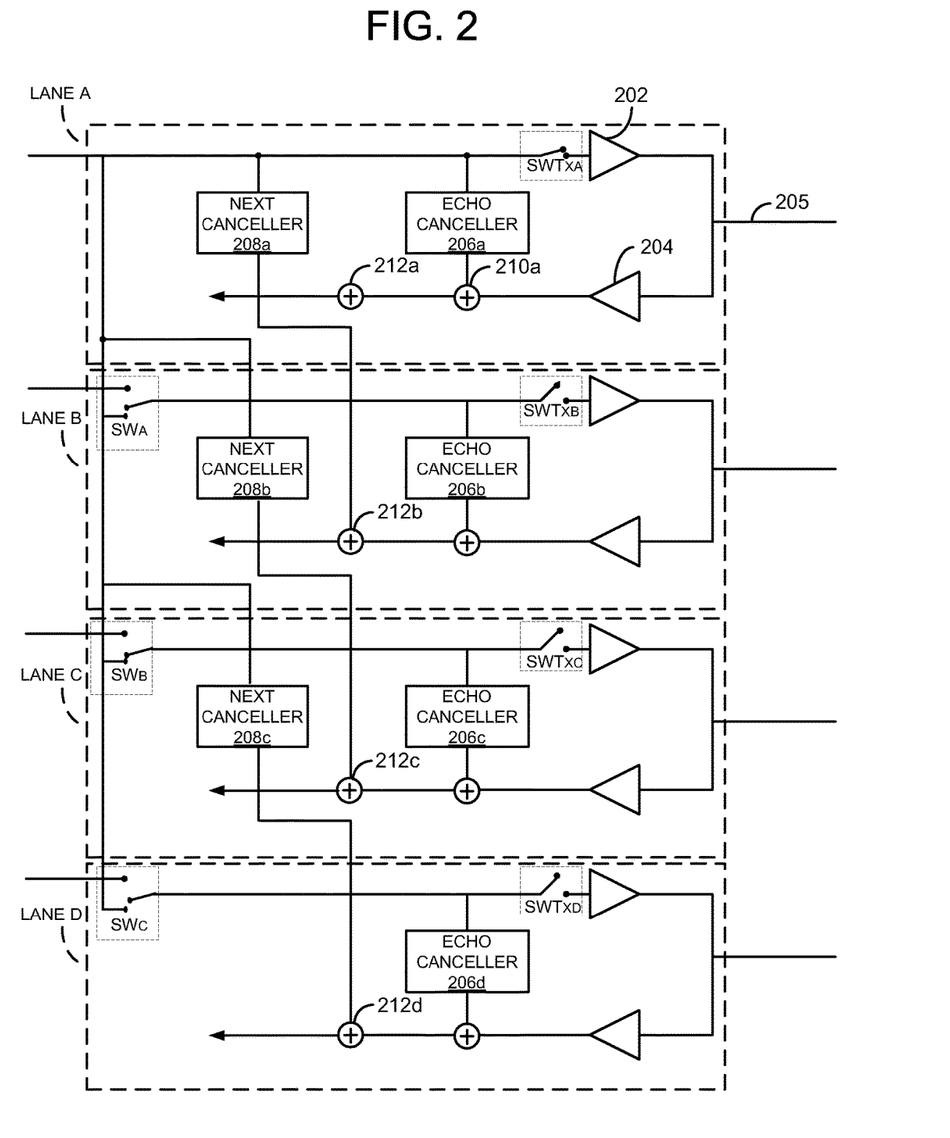
FIG. 2 illustrates a block diagram of one high-level embodiment of one of the transceiver chips of FIG. 1.

FIG. 2 illustrates further detail of the transceiver channel circuitry of FIG. 1 for one set of four lanes for the link partners shown in FIG. 1. The circuitry includes four channels, or "lanes" Lane A, Lane B, Lane C, and Lane D. For purposes of clarity, Lane A will be described in detail, with the understanding that each of the lanes is similarly configured. Each lane includes transmit circuitry 202 defining a transmit path and receive circuitry 204 that defines a receive path. Together, the transmit and receive paths couple to a physical transmission medium 205 such as a differential pair of wires corresponding to a portion of the link 106. Disposed between the transmit and receive paths is an echo canceller 206a that characterizes echo signals resulting from reflections of transmit signals along the transmit path during normal operation. In the regular operation mode, the echo canceller generates a compensation signal and applies it to a summing circuit 210a which adds the compensation signal to the received signal from the receive circuitry 204 and thus minimize the effects of echo on the receive path.

Further referring to FIG. 2, to compensate for cross-pair crosstalk during the regular mode of operation, a plurality of near-end crosstalk (NEXT) cancellers 208a, 208b, 208c are coupled between the transmit path of Lane A and respective summing circuits 212b, 212c, and 212d of each of the other lanes. During normal operation, each of the NEXT cancellers generates a crosstalk compensation signal to sum with the received signal on that particular lane. Although not shown in FIG. 2, similar networks of NEXT cancellers are provided between the transmit paths of Lanes B-D and summing nodes 212a-212d.

Figure 3:
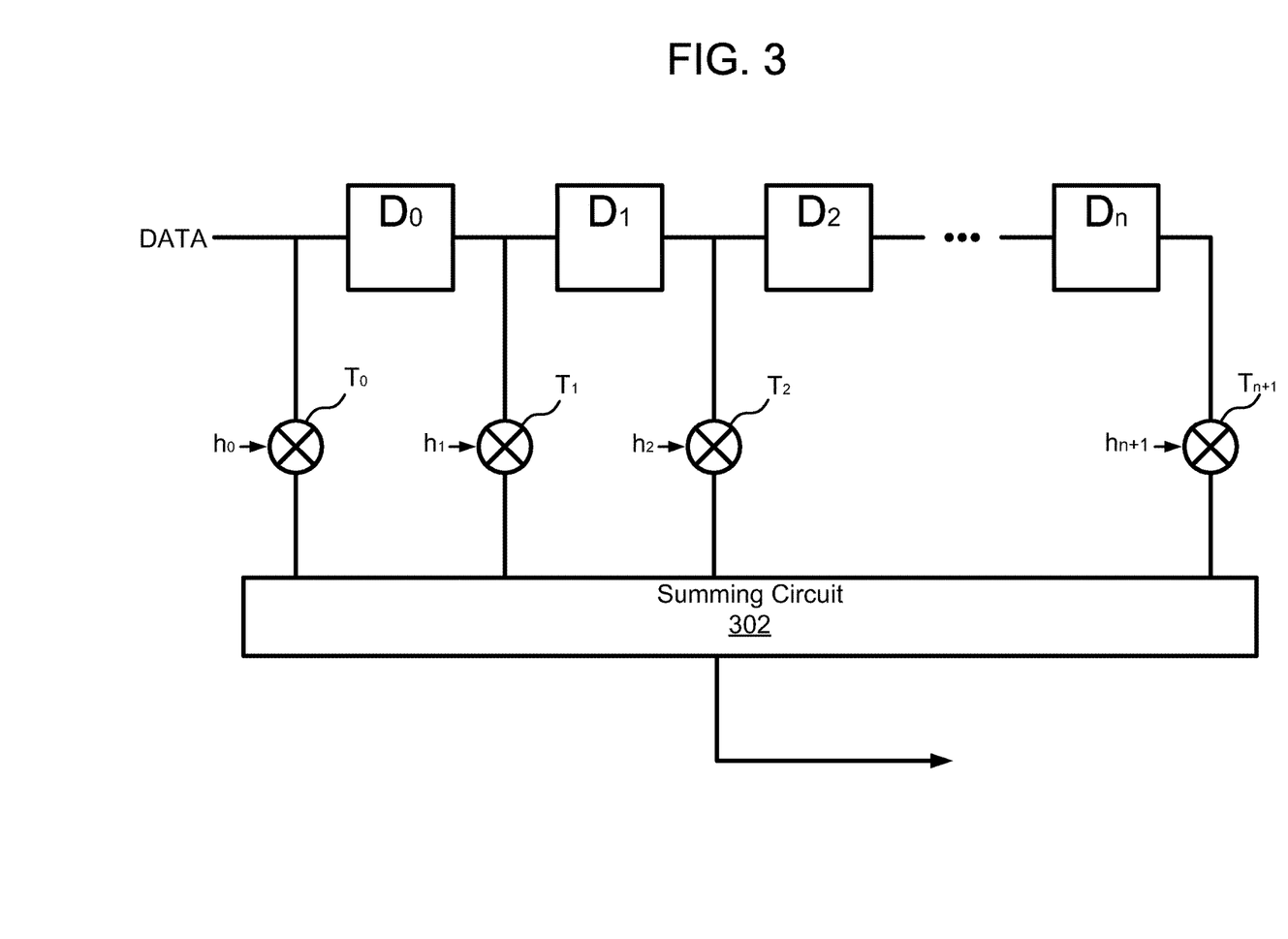
FIG. 3 illustrates further detail of a finite impulse response (FIR) filter architecture employed in the echo cancellers of FIG. 2.

In one embodiment, the echo and NEXT cancellers 206a-206d and 208a-208d are realized as adaptive filters that continually adapt, and more particularly realized as finite impulse response (FIR) filters. While the structure and operation of FIR filters are generally well-known to those skilled in the art, FIG. 3 illustrates one embodiment of a high-level implementation that includes a plurality of delay elements $D_0$-$D_n$, for delaying respective data samples DATA. A number of taps $T_0$-$T_n$ corresponding to the delay elements are respectively coupled to delay output nodes. The taps receive respective weights or coefficients $h_0$-$h_{n+1}$ that represent gain factors applied to a sequence of data samples in a weighted manner. A summing circuit 302 receives the weighted samples from the taps, averages them, and outputs a filtered value.

The length of the adaptive filter, or number of samples to evaluate and average to determine an output, is selectable for a user depending on the application involved. Applications involving near-end crosstalk between cable pairs may warrant the use of only a few samples (weighted with a gain or tap value of 1) since the intended area of interest during typical operation is local to the transceiver circuit itself. Echo cancellers, on the other hand, typically utilize very long lengths due to the round-trip echo path from one link partner to the other, and back. Thus, for diagnosing cross-pair faults across an entire Ethernet cable system, typical NEXT cancellers employed between pairs are generally inadequate, while echo cancellers are well-suited for the application. However, echo cancellers are typically coupled between respective wires for a given pair of wires (in a lane), and not coupled across pairs of wires.

In an effort to utilize the transceiver echo cancellers 206a-206d for cross-pair fault detection during a diagnostic mode, and referring back to FIG. 2, one embodiment provides a network of switches SWA-SWC, and $SWT_{XA}$-$SWT_{XD}$ to selectively tie the inputs of Lanes A-D together. For example, by tying Lanes A and B together, through closure of switch $SW_A$, the echo canceller 206b of Lane B has the same input and output nodes as the NEXT canceller 208a of Lane A. With this situation, the Lane B echo canceller may be employed to characterize cross-pair faults between Lanes A and B along the entire length of cable, as explained further below. As different lanes are diagnosed, the switching network is configured appropriately. In another embodiment, there are no switches SWa, SWb, SWc or SWd, but the transmitters on all channels create the same training signal on all four paths.

Figure 4:
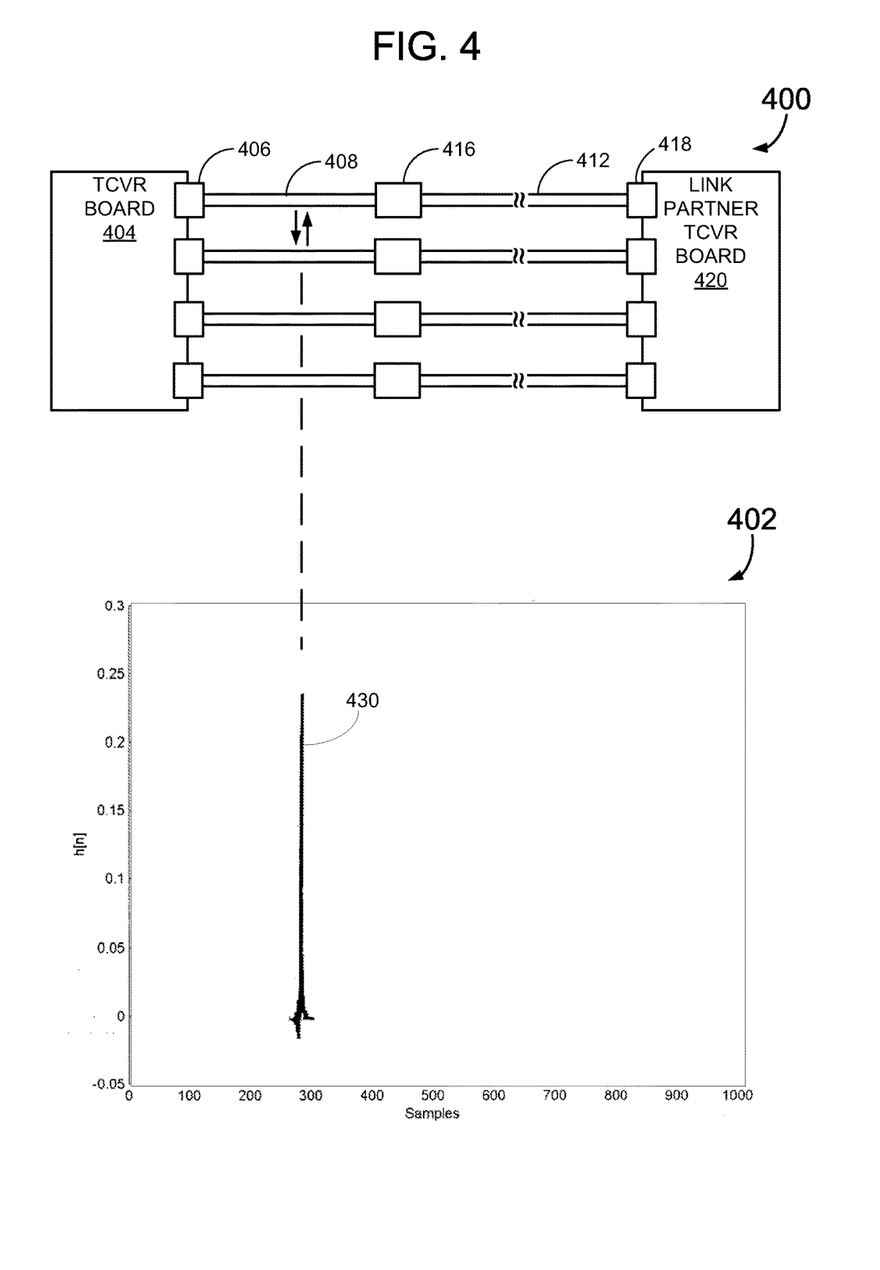
FIG. 4 illustrates a block diagram of one embodiment of an Ethernet cable system utilizing the transceiver architecture of FIG. 1, and presenting an impulse response curve corresponding to cross-pair faults associated with specific segments of the cable system.

FIG. 4 illustrates a block diagram of a high-speed Ethernet system, generally designated 400, and an exemplary corresponding impulse response graph 402. The system generally includes a first transceiver board 404 that mounts a first plurality of transceiver circuits. The circuits may be realized on one or more integrated circuit chips. Each transceiver chip couples to a portion of an Ethernet jack connector 406. In some embodiments, a patch cord 408 may form a first portion of the physical medium length, extending from the jack possibly up to ten feet or so. A second connector 416 interfaces the far end of the patch cable to a long section of Ethernet cable 412, possibly extending eighty feet or so. A further patch cable (not shown) may be employed, and coupled to the Ethernet cable 412 via a third connector (not shown). A second jack connector 418 then joins the Ethernet cable to a link partner transceiver board 420 that includes a plurality of corresponding transformer circuits that operate as link partners to the first plurality of transceiver circuits.

As explained above, in a diagnostic mode of transceiver operation, the echo cancellers 206a-206d (FIG. 3) may be utilized in a way that characterizes the cross-pair paths during transmission of one or more training signals along one of the transmit paths 202. Generally, the echo canceller generates a series of impulse responses for multiple sections of the cable, one such section being shown in the impulse response graph 402. The large impulse portion of the waveform, at 430, corresponds to a cross-pair fault, such as unacceptable leakage or, in an extreme scenario, a short circuit between channels.

Once the cross-pair impulse responses are generated by the echo cancellers (which, in effect, are being reused as NEXT cancellers in the diagnostic mode) for a given section of the cable, they may be compared to one or more predetermined impulse responses that correspond to the system, including the cable type, length, individual segment lengths of patch cords, and so forth. The actual impulse response and expected impulse response are then compared by the processor circuitry to diagnose any cable faults or mismatches. In other embodiments, a threshold may be set for each portion of the impulse response corresponding to, for example, a connector interface point. If the magnitude of the impulse response exceeds the threshold, then a fault or mismatch exists. The location and the magnitude of the pulse can be used to identify the location and intensity of the crosstalk in the cable.

In some applications, white Gaussian noise may affect the UTP channel such that there may be a high power of noise relative to the power of the desired signal. Such a condition involves a low signal-to-noise ratio SNR. Where the SNR is too low, the location and magnitude of the pulses in the crosstalk channel may not be estimated accurately. To improve the SNR of the noisy waveform, a match filter may be employed to receive the noisy signal as an input. The match filter is configured such that its impulse response is a time-reversed complex-conjugated scaled version of the signal being sought. The output of the match filter then presents a cleaner signal, with a significantly improved SNR when sampled at the peak point of the pulse.

Because of the lowpass characteristics of UTP channels a sharp transmitted pulse will be widened when it travels through the cable. This is a very well known effect that is also known as Inter-Symbol Interference. This effect can reduce the accuracy in estimation of the peak location and therefore will impact the accuracy and resolution of the fault localization algorithm. In other embodiments, the impulse response from the echo canceller may be further processed using equalization concepts. An equalizer is a filter with coefficients, as is well-known in the art, to restore a pulse substantially back to its original sharp waveform shape. By tuning the pulse back to its narrow width, the location of a fault may be more accurately determined with analysis of the impulse response.

Figure 5:
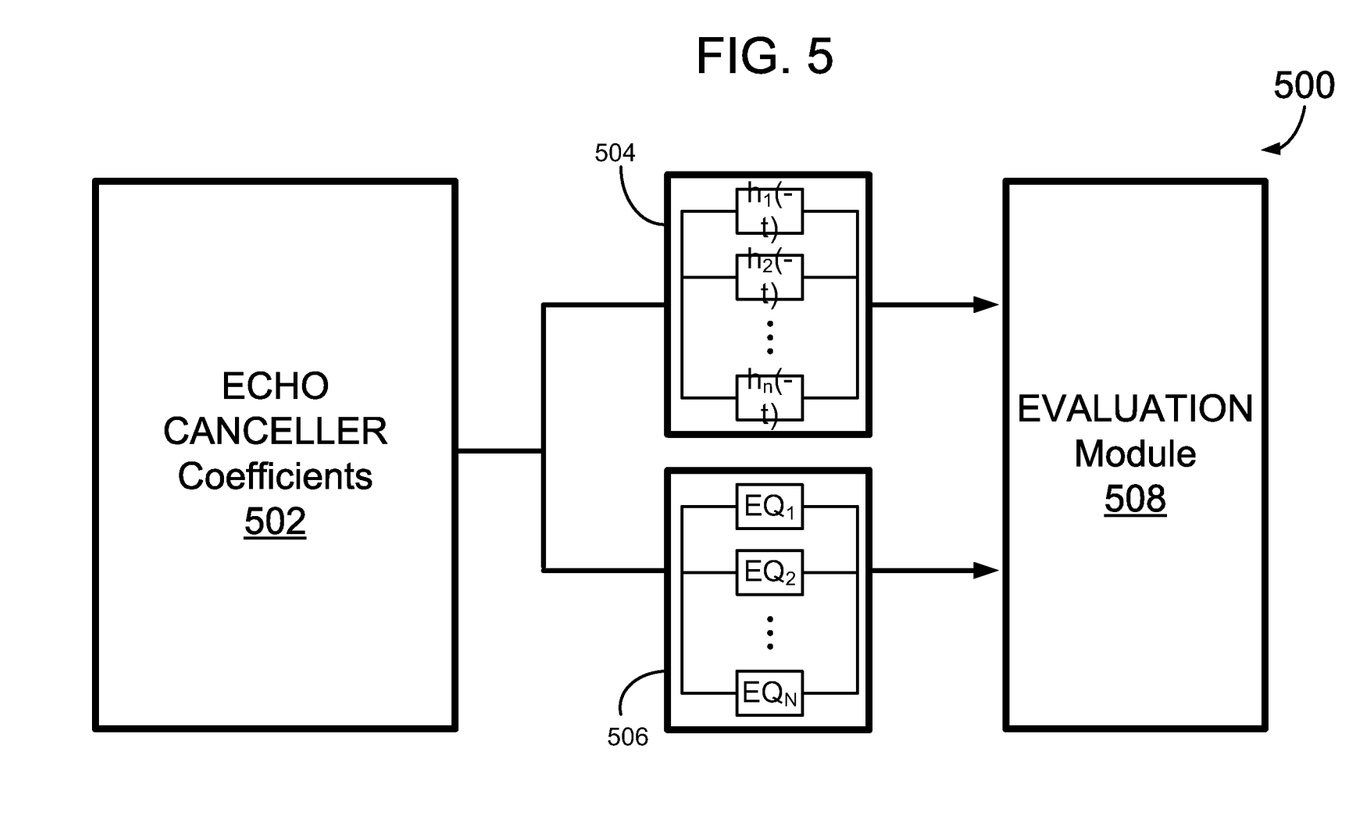
FIG. 5 illustrates one embodiment of a match filter bank in parallel with an equalizer bank for use in the transceiver architecture of FIG. 1.

FIG. 5 illustrates a block diagram of a portion of a transceiver circuit 500 where, in an effort to provide complete diagnostic coverage of the cable, an echo canceller 502 feeds an impulse response to a bank or array of match filters 504, and/or a bank 506 of equalizers $EQ_1$-$EQ_N$. The array 504 of match filters $h_1(-t)$-$h_N(-t)$ are disposed at the output of the echo canceller circuit 502 and each is configured with an expected impulse response corresponding to a specific section of the cable. For instance, the first match filter $h_1(-t)$, may be configured to provide an optimal filtering point at the first meter of cable, while filter $h_2(-t)$ may be optimized for the second meter, and so on. Each match filter generates a separate filtered response, and the responses are fed through the receive path for further post processing by an evaluation circuit 508 disposed in the processing circuitry. In this manner, each filtered response may be compared to an expected response for that specific section of cable. If an irregularity is discovered, the presence of a fault or mismatch may be determined as existing at that location and further analyzed for the level of mismatch (if there is no open or short circuit condition). Each of the equalizers EQ1-EQN in the equalizer bank 506 includes configured coefficients that are optimized for a given section of the cable, similar to the match filters $h_1(-t)$-$h_N(-t)$. Both of the banks of filters may be employed, or one or the other, depending on the application. The matched filters provide the maximum SNR to identify the presence of a fault and the equalizers provide the best localization of the fault. The use of bank of filters, either for matched filtering or equalization, is simply one embodiment to implement a time-varying filter. Any other implementation of the time-varying filters can also be used in this application.

Figure 6:
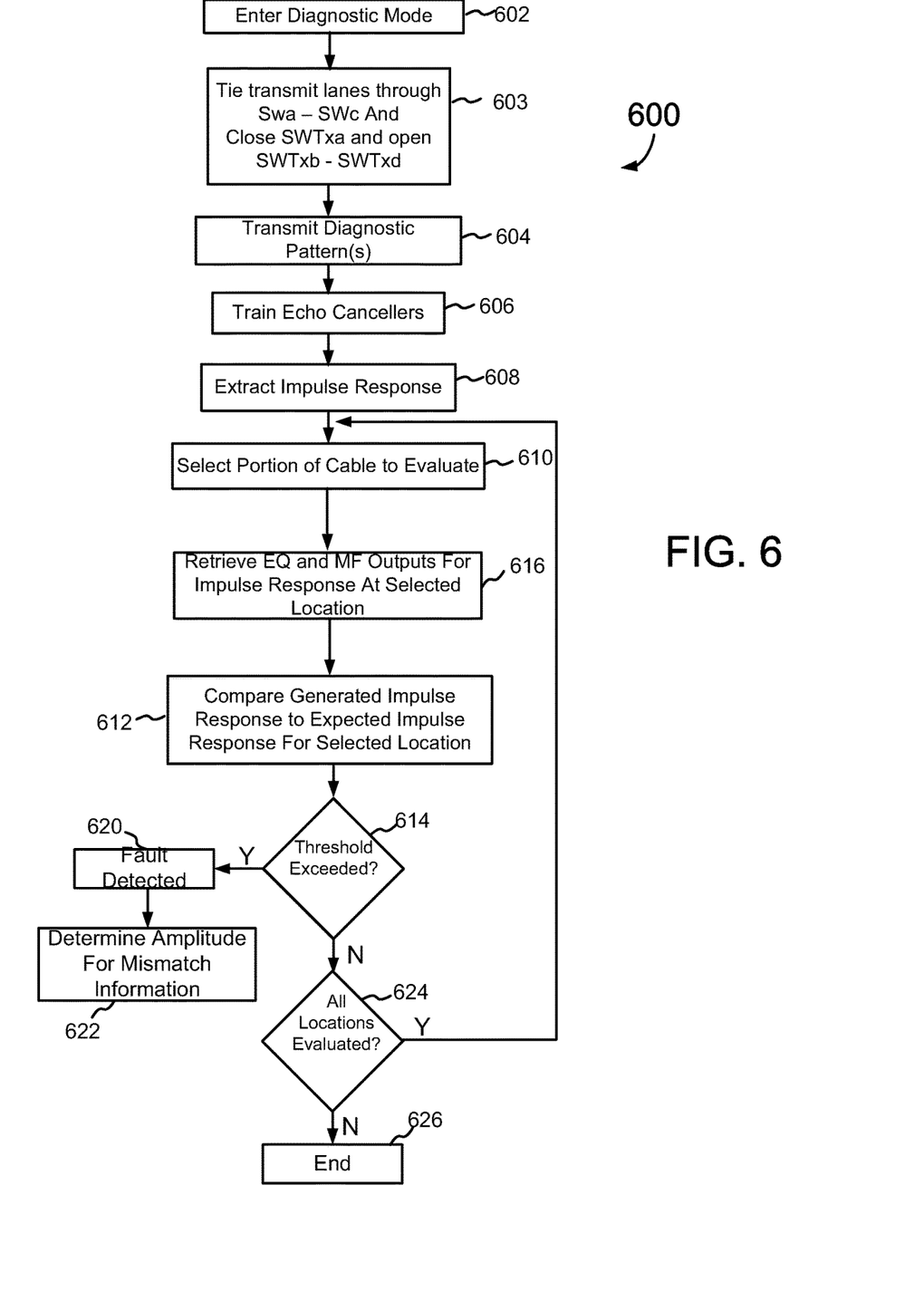
FIG. 6 illustrates a flowchart setting forth a method of operation utilizing the echo canceller circuitry of FIG. 3 to detect and identify cross-pair faults in the cable system of FIG. 4.

Referring now to FIG. 6, a flowchart is shown that illustrates a method of operation of the transceiver circuitry of FIG. 5. The method, generally designated 600, begins with the transceiver circuitry entering a diagnostic mode, at step 602. The diagnostic mode is to be contrasted to a normal mode of operation and generally occurs during an initialization sequence between the link partners. Upon entering the diagnostic mode, the network of switches $SW_A$-$SW_c$ ties the transmit lanes together and close switch SWTxA and open switches SWTxB-D, at step 603, or configures the transmit paths such that the same signal appears on all transmit lanes and also the transmit signal is outputted only on one channel (A). The diagnostic mode is initiated with the generation and transmission of diagnostic patterns or signal sequences for the first of the four lanes, at step 604. This training signal can be similar to the 10G training signal specified in the IEEE specifications but it can also be any other white, wideband signal.

With further reference to FIG. 6, cross-pair information (whether a fault or standard cable condition) associated with the transmit channel and the other lanes is detected by the echo canceller of a different lane than the one carrying out the transmission, and responds to the cross-pair information in an adaptive manner to train its coefficients, at step 606. The result of the training generates an impulse response, at step 608. A portion of the cable is then selected, at step 610, and the generated impulse response compared to an expected impulse response for the selected cable location, at step 612. The expected impulse response may involve a model or simulated impulse response based on typical cables, operating environments, or the like, and provides a reference point for comparison purposes to the actual detected impulse response.

Based on the comparison, at step 612, a determination may then take place to see, for example, whether a threshold magnitude of the impulse response was exceeded, at step 614. If a threshold is exceeded, then the processing circuitry characterizes the event as a detected fault, at step 620, and the amplitude of the response identified to evaluate the level of mismatch. If a threshold is not exceeded, then a further determination is made whether all locations of the cable have been evaluated, at step 624. If all of the locations have been analyzed, then the process ends, at step 626. If locations remain to be evaluated, then a different portion of the cable is selected, at step 610, and the comparison and determination steps iterated one or more times.

For better identification of cable faults in noisy environment and better localization of the faults in the cable, the echo pulse response is passed through proper matched filter and equalizing filters. A big amplitude at the output of the matched filter identifies the fault and in that case the output of the equalizing filter may be utilized to estimate the location of the fault. Note again that the loop consisting of blocks 610 to 624 is simply one implementation of time-varying filtering of the echo cancellers pulse response. This time varying filtering may be implemented in any other ways that may not require filter banks and the loop highlighted in FIG. 6. Note also the flow chart of FIG. 6 shows the steps to identify the cross-coupling faults from channel A to the other channels. The same process has to be repeated for all other channels if the cross-coupling faults from those channels to other channels are also of interest.

Those skilled in the art will appreciate the benefits and advantages afforded by the transceiver circuitry and method described above. By reusing the echo cancellation circuitry during a cable diagnostic mode as NEXT canceller circuitry, an accurate and straightforward determination of cross-pair faults and/or mismatches may be carried out. Moreover, by employing match filtering and/or equalization, waveforms that are attenuated and/or exhibit a low SNR may be processed, localized and enhanced to provide more accurate diagnostic results.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A method of detecting a fault in an Ethernet system, the system having multiple physical channels, the multiple physical channels bounded by respective first and second link partner transceiver circuits and having a channel length, the method comprising:
  entering a diagnostic mode of operation;
  at the first transceiver circuit, electrically connecting a first physical channel to a second physical channel;
  transmitting a test pattern along the first and second physical channels from the first transceiver circuit to the second transceiver circuit along the channel length;
  at a first receiver for the first physical channel, receiving cross-channel information corresponding to the transmitted test pattern along the first and second physical channels;
  training an echo canceller corresponding to the second physical channel to generate a detected impulse response corresponding to the crosstalk information received at the first physical channel;
  generating multiple expected impulse responses, each of the multiple expected impulse responses corresponding to a specific range of location along the channel length;
  for a selected one of the range locations along a portion of one of the physical channels, comparing the generated detected impulse response to an expected impulse response for that selected range of location; and
  determining whether a fault within the selected range location exists based on the comparing.

2. The method according to claim 1 wherein the physical channels have respective transmit inputs, and electrically connecting comprises switchably coupling the inputs together.

3. The method according to claim 1 wherein the multiple channels include respective inputs to receive input signals, and electrically connecting comprises feeding the same input signals to the multiple inputs.

4. The method according to claim 1 and further including:
  exiting the diagnostic mode of operation;
  entering a normal mode of operation; and
  reusing the echo canceller in the second of the multiple channels to compensate for echo signals along the second channel.

5. The method according to claim 1 and further including:
  equalizing the generated detected impulse response prior to comparing to the expected impulse responses.

6. The method according to claim 1 and further including:
  match filtering the generated detected impulse response prior to comparing to the expected impulse responses.

7. The method according to claim 1 wherein the determining comprises:
comparing the generated detected impulse response to a threshold level.

8. The method according to claim 7 wherein the determining includes evaluating the fault based on an amplitude associated with the generated detected impulse response.

9. An Ethernet transceiver system for coupling to an Ethernet cable, the Ethernet transceiver system comprising:
a first physical channel having a channel length and including
a first transmit circuit path having an input,
a first receive circuit path, and
a first echo canceller circuit disposed between the first transmitter circuit path and the first receiver circuit path to, during a first operation mode, characterize echo signals along the first transmit path;
a second physical channel having the channel length and including
a second transmit circuit path having an input,
a second receive circuit path, and
a second echo canceller circuit disposed between the second transmitter circuit and the second receive circuit path to, during the first operation mode, characterize echo signals along the second transmit path;
wherein during a cable diagnostic mode of operation, the second echo canceller is electrically connected to the first transmit path to generate a detected impulse response corresponding to crosstalk information between the first and second physical channels; and
comparison logic to, for a selected range of location along a portion of the channel length, compare the generated detected impulse response to an expected impulse response for that selected range of location; and
logic to determine whether a fault associated with the selected range of location exists based on the comparing.

10. The Ethernet transceiver system according to claim 9 wherein during the cable diagnostic mode, the first and second inputs are coupled together.

11. The Ethernet transceiver system according to claim 9 wherein during the cable diagnostic mode, the first and second inputs receive the same input signals.

12. The Ethernet transceiver system according to claim 9 wherein the second echo canceller includes a plurality of tap coefficients sufficient to characterize the crosstalk path along the entire cable length.

13. The Ethernet transceiver system according to claim 9 and further comprising:
respective third and fourth physical channels, and having respective third and fourth echo cancellers electrically connected to the first transmit path during the cable diagnostic mode.

14. The Ethernet transceiver system according to claim 9 wherein the echo canceller includes an output coupled to an equalizer circuit.

15. The Ethernet transceiver system according to claim 9 wherein the echo canceller includes an input coupled to a match filter circuit.

16. An Ethernet cable system including:
transceiver circuitry;
an Ethernet cable coupled to the transceiver circuitry, wherein the transceiver circuitry includes
a first physical channel including a first transmit circuit path,
a second physical channel including a second transmit circuit path,
an echo canceller circuit disposed between the first transmitter circuit path and the second transmit circuit path, wherein during a diagnostic mode, the echo canceller circuit generates a detected impulse response associated with cross-channel faults along the Ethernet cable,
comparison logic to, for a selected range of location along a portion of one of the physical channels, compare the generated detected impulse response to an expected impulse response for that selected range of location, and
logic to determine whether a fault associated with the selected range of location exists based on the comparing.

17. The Ethernet cable system according to claim 16 and further including:
a plurality of match filters coupled to the echo canceller circuit, each match filter including coefficients configured for a particular segment of the Ethernet cable.

18. The Ethernet cable system according to claim 17 wherein each segment of the cable comprises a length of the Ethernet cable from the transceiver circuits to a predetermined location along the Ethernet cable.

19. The Ethernet cable system according to claim 16 and further including:
a plurality of equalizers coupled to the echo canceller circuit, each equalizer including predetermined taps corresponding to a particular segment of the Ethernet cable.

* * * * *